(12) United States Patent
Wehner

(10) Patent No.: US 8,559,113 B2
(45) Date of Patent: Oct. 15, 2013

(54) MULTI-SPECTRAL SUPER-PIXEL FILTERS AND METHODS OF FORMATION

(75) Inventor: Justin G. A. Wehner, Goleta, CA (US)

(73) Assignee: Raytheon Company, Waltham, MA (US)

( * ) Notice: Subject to any disclaimer, the term of this patent is extended or adjusted under 35 U.S.C. 154(b) by 820 days.

(21) Appl. No.: 12/635,318

(22) Filed: Dec. 10, 2009

(65) Prior Publication Data
US 2011/0141569 A1    Jun. 16, 2011

(51) Int. Cl.
*G02B 5/28* (2006.01)
*G02B 5/22* (2006.01)

(52) U.S. Cl.
USPC .......................... 359/589; 359/891

(58) Field of Classification Search
USPC .......................... 359/359, 589, 891
See application file for complete search history.

(56) References Cited

U.S. PATENT DOCUMENTS

| | | | |
|---|---|---|---|
| 3,971,065 A | 7/1976 | Bayer | |
| 4,783,594 A | 11/1988 | Schulte et al. | |
| 5,113,076 A | 5/1992 | Schulte | |
| 5,559,336 A | 9/1996 | Kosai et al. | |
| 5,731,621 A | 3/1998 | Kosai | |
| 5,747,863 A * | 5/1998 | Shoda | 257/440 |
| 5,959,339 A | 9/1999 | Chapman et al. | |
| 6,049,116 A | 4/2000 | Park et al. | |
| 7,135,698 B2 | 11/2006 | Mitra | |
| 2007/0077525 A1 * | 4/2007 | Davis et al. | 430/322 |
| 2007/0145273 A1 | 6/2007 | Chang | |
| 2009/0279173 A1 * | 11/2009 | Chui et al. | 359/577 |
| 2009/0279174 A1 * | 11/2009 | Miles et al. | 359/580 |

OTHER PUBLICATIONS

Krishna, et al., "Quantum Dot Infrared Sensors with Photonic Crystal Cavity," Proceedings of the Laser and Electro-optical Society, vol. 1, pp. 909-910, Dec. 5, 2005.
Wehner et al., "Multi-Band, Reduced-Volume Radiation Detectors and Methods of Formation," U.S. Appl. No. 12/640,586, filed Dec. 17, 2009, 27 pages.

* cited by examiner

*Primary Examiner* — Alessandro Amari
(74) *Attorney, Agent, or Firm* — Lando & Anastasi, LLP

(57) ABSTRACT

Multi-spectral filter elements and methods of formation are disclosed. Each multi-spectral filter element may include a plurality of sub-filters that are, in some embodiments, each adapted to respond to electromagnetic radiation within respective ones of a plurality of spectral bands. A method embodiment includes forming an optical cavity layer. Volume of the optical cavity layer can be reduced in at least N−1 number of spatial regions. The reducing may include a number of selective removal steps equal to the binary logarithm function $Log_2$ N. In this example, each spatial region corresponds to a respective one of the plurality sub-filters. The plurality of sub-filters include at least N sub-filters. In particular embodiments, the respective ones of the plurality of spectral bands may be at least partially discrete with respect to each other.

15 Claims, 2 Drawing Sheets

MULTI-SPECTRAL SUPER-PIXEL FILTERS AND METHODS OF FORMATION

TECHNICAL FIELD

This invention relates generally to radiation filtration, and more particularly to multi-spectral super-pixel filters and methods of formation.

BACKGROUND

Current multi-spectral imaging systems are limited for a variety of reasons. For example, many multi-spectral imaging systems are bulky and costly due to the fact that they typically rely on optics elements to separate the spectral information. Many systems are either filter-wheel type or diffractive/refractive type, resulting in the need for many frames to make one multi-spectral cube. Some systems are one-dimensional and rely on scanning architecture, thereby further increasing cost. These and a variety of other limitations often greatly limit infrared (IR) spectroscopic applications.

SUMMARY OF THE INVENTION

Multi-spectral filter elements and methods of formation are disclosed. Each multi-spectral filter element may include a plurality of sub-filters that are, in some embodiments, each responsive to electromagnetic radiation within respective ones of a plurality of spectral bands. A method embodiment includes forming an optical cavity layer. Volume of the optical cavity layer can be reduced in at least N−1 number of spatial regions. The reducing may include a number of selective removal steps equal to the binary logarithm function $Log_2$ N. In this example, each spatial region corresponds to a respective one of the plurality sub-filters. The plurality of sub-filters include at least N sub-filters. In particular embodiments, the respective ones of the plurality of spectral bands may be at least partially discrete with respect to each other.

In one embodiment an array of multi-spectral filter elements comprises a plurality of multi-spectral filter elements, where each of the plurality of multi-spectral filter elements is adapted to respond to electromagnetic radiation within a plurality of spectral bands. In this embodiment, each of the plurality of multi-spectral filter elements comprises a first sub-filter element that is adapted to respond to electromagnetic radiation within a first one of the plurality of spectral bands. The first sub-filter element comprises a first optical cavity having an average thickness of approximately X. Each of the plurality of multi-spectral filter elements comprises a second sub-filter element that is adapted to respond to electromagnetic radiation within a second one of the plurality of spectral bands. In this example, the second sub-filter element comprises a second optical cavity having an average thickness of approximately X−Y. Each of the plurality of multi-spectral filter elements further comprises a third sub-filter element that is adapted to respond to electromagnetic radiation within a third one of the plurality of spectral bands. The third sub-filter element comprises a third optical cavity having an average thickness of approximately X−Z. In addition, each of the plurality of multi-spectral filter elements comprises a fourth sub-filter element adapted to respond to electromagnetic radiation within a fourth one of the plurality of spectral bands. The fourth sub-filter element comprises a fourth optical cavity having an average thickness of approximately X−Y−Z. In this particular embodiment, each of the first, second, third, and fourth optical cavities comprise respective portions of a solid dielectric layer.

Particular embodiments disclosed herein may provide one or more technical advantages. For example, various embodiments may enable a low-cost, multi-spectral sensors having reduced system size and complexity. Various embodiments may be capable of spatially filtering an N number of spectral regions using N sub-pixels filters. The cavity of these N sub-pixels filters may be shaped to respective dimensions suitable for desired resonation using as few removal steps of the cavity as the binary logarithmic function $Log_2$ N. Certain embodiments may improve device performance by mitigating harmful diffraction. Particular embodiments may enable a denser pixel arrangement that facilitates higher resolution. Particular embodiments may enable the formation of layers-in-common for discretely tuned optical filters. Certain embodiments may provide all, some, or none of these advantages. Certain embodiments may provide one or more other advantages, one or more of which may be apparent to those skilled in the art from the figures, descriptions, and claims included herein.

BRIEF DESCRIPTION OF THE DRAWINGS

For a more complete understanding of the present invention and advantages thereof, reference is now made to the following description taken in conjunction with the accompanying drawings, in which.

DESCRIPTION OF EXAMPLE EMBODIMENTS

Various example embodiments disclosed herein are explained in the context of multi-band radiation filters and methods of formation. Certain embodiments may provide enhanced spectral imaging performance within multiple spectral regions. Additionally, certain embodiments may be formed using precise and relatively inexpensive semiconductor processing techniques. Although various example embodiments disclosed herein are explained in the context of filtering light provided to an infrared focal-plane (IR-FPA), the teachings of the present disclosure could be applied to any of a variety of alternative applications including, for example, photodiodes, photoconductive detectors, photovoltaic detectors, photodiode detectors, or any other suitable radiation filter and/or detector responsive to a variety of different spectral regions. Additionally, particular embodiments disclosed herein may be implemented using any number of techniques, whether currently known or in existence. The present disclosure should in no way be limited to the example implementations, drawings, and techniques illustrated below. The drawings are not necessarily drawn to scale.

Figure 1A:
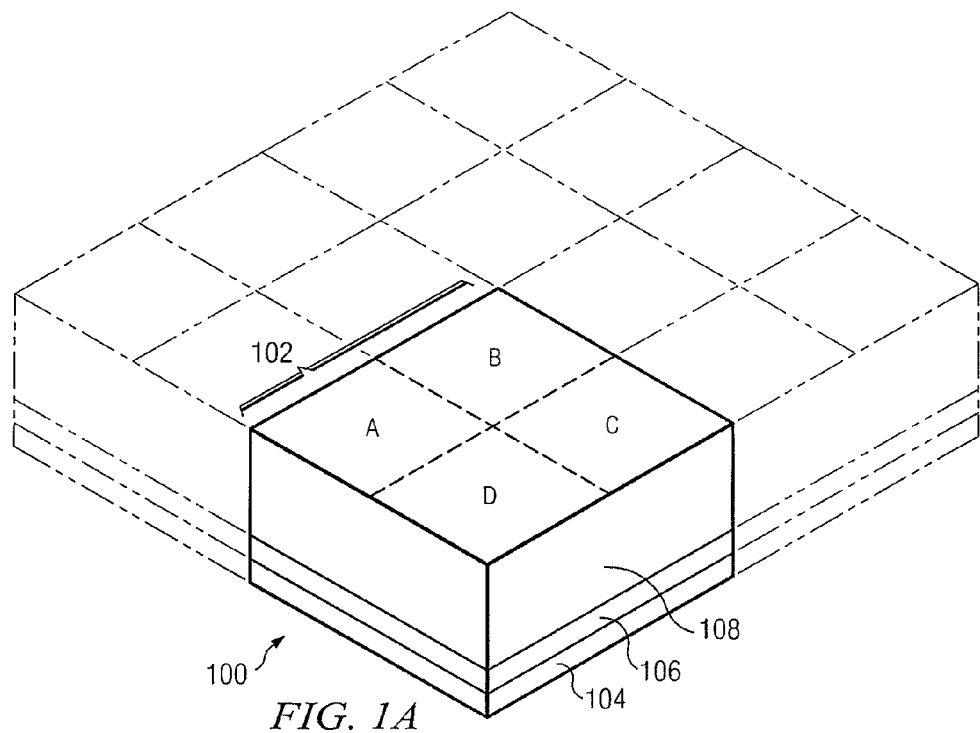
FIGS. 1A through 1C illustrate one example embodiment of a portion of a multi-spectral filter at various stages of formation including one or more super-pixels according to one embodiment.
Figure 1B:
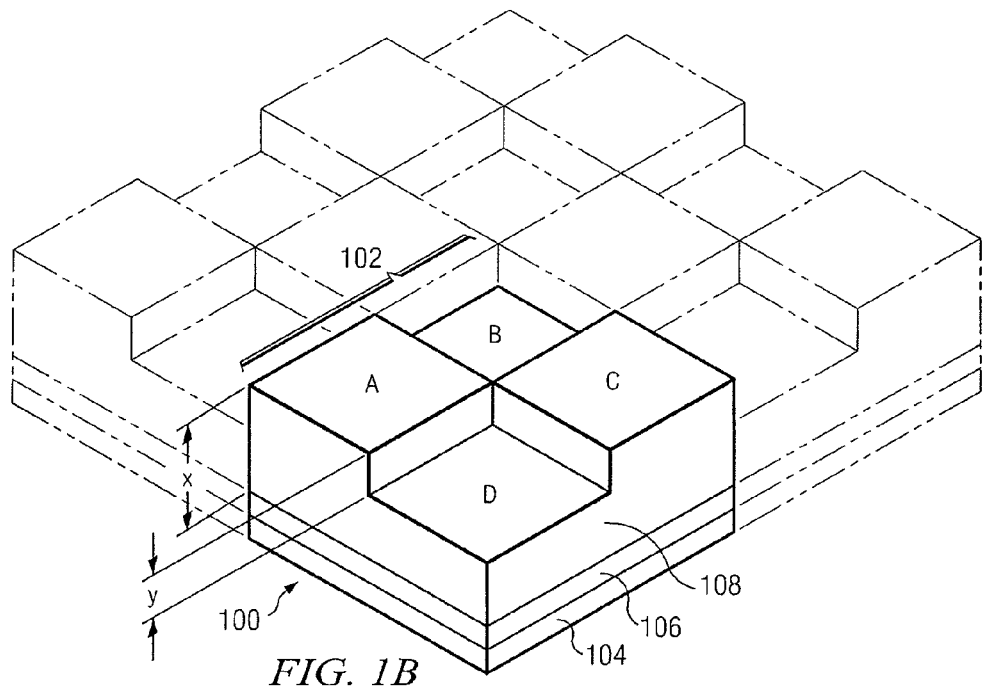
Figure 1C:
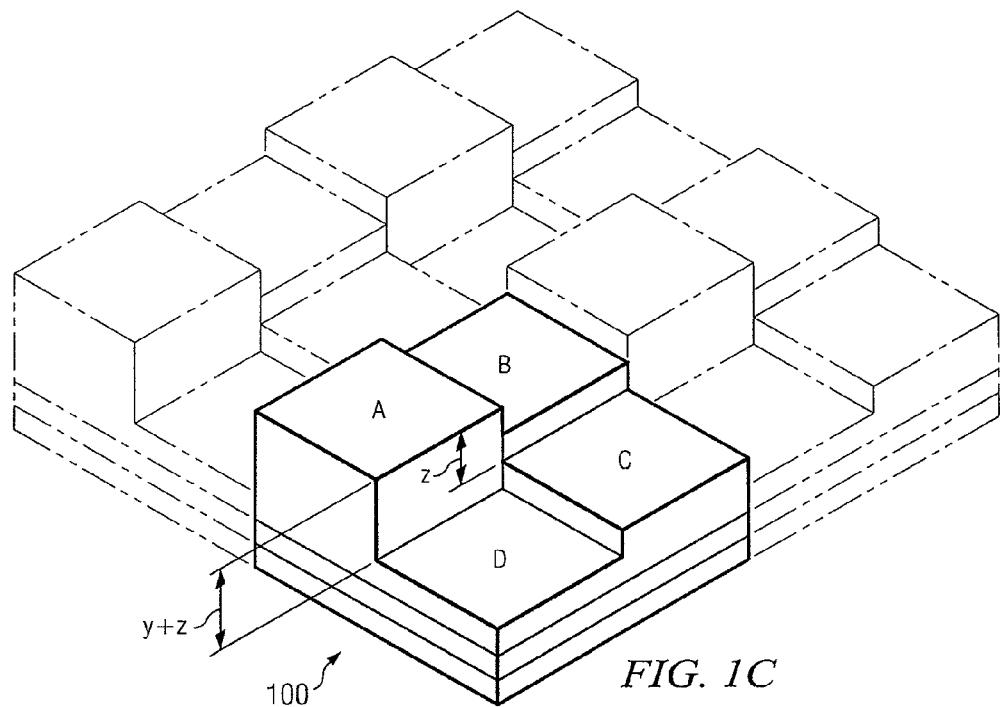

FIGS. 1A through 1C illustrate one example embodiment of a portion of a multi-spectral filter system 100 including one or more super-pixels 102 at various stages of formation. In particular embodiments, filter system 100 may be a color filter array (CFA) configured to filter light provided to a surface of focal-plane array (FPA), such as, for example, an IR-FPA. In this regard, system 100 may function as a Bayer filter having an array of multiple super-pixels 102 arranged in a one-, two-, or three-dimensional pattern. Each super-pixel 102 may have two or more sub-pixel filters (e.g., sub-pixel filters A, B, C, and/or D) that are responsive to electromagnetic radiation within respective ones of a plurality of differing spectral bands. In particular embodiments, multi-spectral filter system 100 may be configured to be coupled to a focal-plane array, such as, for example, an IR-FPA. Each super-pixel 102 of system 100 may be aligned to, and may be configured to filter light provided to, one or more corresponding pixels of the IR-FPA.

Super-pixel 102 generally includes a substrate 104, one or more reflective layers 106, and an optical cavity 108. Although particular embodiments may include a substrate 104, one or more reflective layers 106, and an optical cavity 108, alternative embodiments may include all, some, or none of these layers. Additionally, alternative embodiments may include any suitable number of additional and/or alternative layers including, for example, one or more interstitial layers that may or may not be capable of filtering, absorbing, and/or transmitting radiation.

As explained further below, portions of optical cavity 108 may be selectively removed, such that optical cavity 108 has a different respective thickness for each sub-pixels filters A, B, C, and/or D. The varying thicknesses of optical cavity 108 may cause sub-pixels filters A, B, C, and/or D to resonate at discrete optical wavelengths. The resonant properties of sub-pixels filters A, B, C, and/or D may result in a multi-spectral super-pixel 102 capable of filtering and/or absorbing radiation in multiple discrete bands (four in this example). Although super-pixel 102 includes four sub-pixels filters A, B, C, and D in this example, super-pixel 102 may include fewer or more sub-pixels filters including, for example, one, two, ten, fifty, hundreds, or more sub-pixels filters.

FIG. 1B illustrates relative thicknesses of sub-pixel filters A, B, C and D after optical cavity 108 is reduced by a thickness of approximately y in selective areas. In this example, the selectively removed portions of optical cavity 108 overlay sub-pixel filters B and D. The thickness of optical cavity 108 overlaying sub-pixel filters A and C are substantially unchanged with respect to the corresponding thicknesses illustrated in FIG. 1A. In relative terms, optical cavity 108 has an initial average thickness of approximately x and the selectively removed volume has a thickness of approximately y. Any suitable processes may be used to selectively remove portions of optical cavity 108 including, for example, photo-lithographic patterning and etching.

FIG. 1C illustrates relative thickness of sub-pixel filters A, B, C, and D after optical cavity 108 is reduced by a thickness of approximately z in selective areas. In this example, the selectively removed portions of optical cavity 108 overlay sub-pixel filters C and D. The thickness of optical cavity 108 overlaying sub-pixel filters A and C are substantially unchanged with respect to the corresponding thicknesses illustrated in FIG. 1B. As a result of the selective removals shown in FIGS. 1B and 1C, sub-pixel filters A, B, C, and D have average optical cavity 108 thicknesses of approximately x, x–y, x–z, and x–(y+z), respectively. These thicknesses x, x–y, x–z, and x–(y+z) may each correspond to particular wavelength resonation. In this example, four different sub-pixel filters A, B, C, and D are formed with varying optical cavity 108 thicknesses using as few as two selective removal steps.

Thus, particular embodiments may have multiple, discretely tuned sub-pixel filters that have a material stack in common and that differ with respect to each other only (or at least) in one parameter of the optical cavity. Various embodiments may use one or more process steps to form respective portions of discretely tuned filters, though the filters may be designed to have different resonant responses. Stated differently, in various embodiments each super-pixel 102 may be capable of spatially filtering an N number of spectral regions using N sub-pixels filters. The optical cavity 108 of these N sub-pixels filters may be shaped to respective dimensions suitable for desired resonant wavelength using as few removal steps of the optical cavity 108 as the binary logarithmic function $Log_2$ N. This enhanced processing feature, which may use one or more processing steps to form respective portions of discretely tuned sub-pixel filter cavities, may be contrasted with processing techniques that form discretely configured filters or detectors one type at a time in separate process steps.

In particular embodiments, the one or more sub-pixel filters for any given super-pixel 102 may be formed adjacent to each other. As shown in FIG. 1C, for example, sub-pixel filters A, B, C, and D of super-pixel 102 are separated only by their differing step heights but otherwise have one continuously joined base. Such a configuration may improve device performance by mitigating harmful diffraction that might otherwise be caused by sub-pixel filters that are spaced apart from each other and that may present more sidewall surfaces or other features possibly contributing to diffraction. Additionally, minimizing the footprint of each super-pixel 102 by joining the bases of sub-pixel filters A, B, C, and D may enable multi-color filtration using less space. Such a configuration may enable a denser pixel arrangement that facilitates higher resolution.

In various embodiments including an array of super-pixels 102, each super-pixel 102 may be joined to one or more adjacently positioned super-pixel 102 such that they share a common base in a manner substantially similar to that described above with reference to sub-pixel filters A, B, C, and D. That is, in particular embodiments, there is no gap separating adjacent super-pixels 102 from each other, which may provide a number advantages, some of which may be analogous to those described above with reference to sub-pixel filters A, B, C, D. In yet other embodiments, there may be a gap separating adjacent super-pixels 102 from each other.

Particular embodiments may enable the formation of layers-in-common for each sub-pixel filter A, B, C, and D. For example, one or more layers disposed inwardly from optical cavity 108 may function as a first reflector-in-common for each sub-pixel filter A, B, C, and D. Another one or more layers disposed outwardly from optical cavity 108 may function as second reflector-in-common for each sub-pixel filter A, B, C, and D. Although sub-pixels A, B, C, and D may have different step heights, the second reflector-in-common may be formed outwardly from each sub-pixel A, B, C, and D substantially simultaneously. For example, the second reflector-in-common may be formed using molecular beam epitaxy, one or more deposition processes, and/or another process capable of growing one or more layers outwardly from each sub-pixel filter A, B, C, and D substantially simultaneously.

Figure 2:
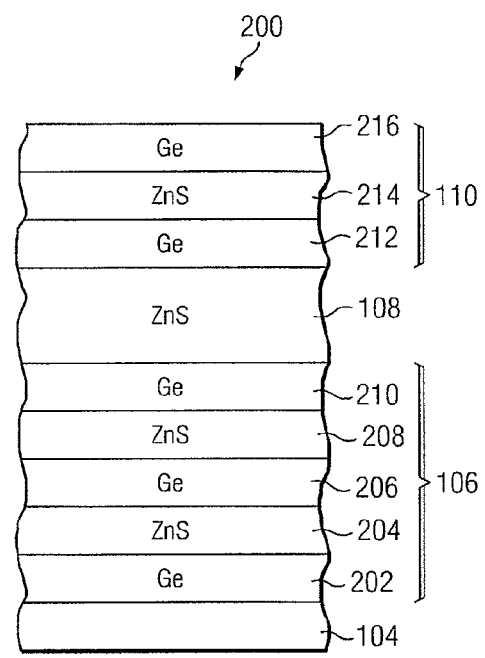
FIG. 2 illustrates a cross-section of one example embodiment of a sub-pixel that may be used to faun a portion of the super-pixel of FIGS. 1A through 1C.

FIG. 2 illustrates a cross-section of one example embodiment of a sub-pixel filter 200 that may be used to form a portion of the super-pixel 102 of FIGS. 1A through 1C. In this example, sub-pixel filter 200 includes a stack of multiple layers 202, 204, 206, 208, 210, 212, 214, and 216 comprised of germanium (Ge) and zinc sulfide (ZnS). Each layer 202-216 is disposed outwardly from Ge substrate 104. In certain embodiments, reflective layer 106 may be comprised of Ge and ZnS layers 202, 204, 206, 208, and 210. In various embodiments, a reflective capping layer 110 may be comprised of Ge and ZnS layers 212, 214, and 216. Each layer of the sub-pixel filter stack may have any suitable dimensions. In a particular embodiment, Ge layers 202, 206, 210, 212, and 216 may each have a respective average thickness of approximately 256.1 nanometers (nm). In certain embodiments, ZnS layers 204, 208, and 214 may each have a respective average thickness of approximately 500 nm. Although Ge and ZnS is used in the example for substrate 104 and for layers 202, 204, 206, 208, 210, 212, 214, and 216, any suitable materials may be used. Additionally, any suitable number of layers including, for example, fewer or more layers and/or one or more interstitial layers may be used. Although example thicknesses are disclosed for layers 202-216, any suitable thickness may be used.

An optical cavity 108 or sacrificial cavity is disposed between Ge layers 210 and 212. Although optical cavity 108 is comprised of ZnS in this example, any suitable dielectric material may be used including, for example, zinc selenide, germanium, silicon, silicon dioxide, and/or alternative dietetic material suitable for optical filters. As discussed previously, the thickness of optical cavity 108 may be selected based at least in part on the desired resonant wavelength response of the corresponding sub-pixel filter. For example, optical cavity 108 may have an average thickness for sub-pixels A, B, C, and D, of approximately 1180 nm, 1050 nm, 920 nm, and 790 nm, respectively. In this manner, super-pixel 102 may be capable of filtering discrete bands, illustrating a four-color example, with each of these bands being applied to a pixel on the IR-FPA, thereby creating a four color super-pixel.

The non-limiting example thicknesses discussed above for the sacrificial optical cavity 108 of sub-pixels A, B, C, D may, in certain cases, be suitable for a mid-wave infrared (MWIR) transmission window including 3 to 5 micrometers (μm). Although the thicknesses used in this example correspond to MWIR, multi-spectral system 100 may be responsive to any suitable spectral range including, for example, near-infrared (NIR), short-wavelength infrared (SWIR), long-wavelength infrared (LWIR), very-long wave infrared (VLWIR), another region within the infrared spectrum, and/or radiation outside the infrared spectrum. As used herein, NIR radiation includes a spectral region extending from approximately 0.5 to 1 micrometers, SWIR radiation includes a spectral region extending from approximately 1 to 3 micrometers, MWIR radiation includes a spectral region extending from approximately 3 to 8 micrometers, LWIR radiation includes a spectral region extending from approximately 8 to 12 micrometers, and VLWIR radiation includes a spectral region extending from approximately 12 to 30 micrometers.

The components of the systems disclosed herein may be integrated or separated. Moreover, the functions of the elements and/or layers may be performed by more, fewer, or other components. For example, particular embodiments may include multiple filtering layers and/or one or more diffraction gratings. As another example, particular embodiments may include one or more super-pixels that each include only two sub-pixel filters. Particular operations of the systems and apparatuses disclosed herein may be performed using any suitable logic embodied in computer-readable media. As used in this document, "each" refers to each member of a set or each member of a subset of a set.

Although the present disclosure has been described above in connection with several embodiments, a myriad of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. An array of multi-spectral filter elements comprising a plurality of multi-spectral filter elements each adapted to respond to electromagnetic radiation within a plurality of spectral bands, each of the plurality of multi-spectral filter elements comprising:
   an optical cavity layer that is a solid dielectric layer,
   a first sub-filter element adapted to respond to electromagnetic radiation within a first one of the plurality of spectral bands, the first sub-filter element comprising a first optical cavity formed in the optical cavity layer and having an average thickness of approximately X;
   a second sub-filter element adapted to respond to electromagnetic radiation within a second one of the plurality of spectral bands, the second sub-filter element comprising a second optical cavity formed in the optical cavity layer and having an average thickness of approximately X−Y;
   a third sub-filter element adapted to respond to electromagnetic radiation within a third one of the plurality of spectral bands, the third sub-filter element comprising a third optical cavity formed in the optical cavity layer and having an average thickness of approximately X−Z; and
   a fourth sub-filter element adapted to respond to electromagnetic radiation within a fourth one of the plurality of spectral bands, the fourth sub-filter element comprising a fourth optical cavity formed in the optical cavity layer and having an average thickness of approximately X−(Y+Z);
   wherein the first, second, third, and fourth ones of the plurality of spectral bands are at least partially discrete with respect to each other, and each comprise respective spectral wavelength ranges between 1 and 30 micrometers;
   wherein Y and Z are non-zero values of linear dimension, both being less than X, and wherein Y+Z is less than X; and
   wherein the first, second, third, and fourth sub-filter elements are disposed adjacent one another, and the optical cavity layer provides one continuously joined base for all of the first, second, third, and fourth sub-filter elements.

2. The array of multi-spectral filter elements of claim 1, wherein X is between 5 and 5000 nanometers.

3. The array of multi-spectral filter elements of claim 1, further comprising a first single reflector disposed outwardly from each of the first sub-filter element, the second sub-filter element, the third sub-filter element, and the fourth sub-filter element, the first single reflector being a continuous reflector-in-common for each of the first sub-filter element, the second sub-filter element, the third sub-filter element, and the fourth sub-filter element.

4. The array of multi-spectral filter elements of claim 3, further comprising a second single reflector disposed inwardly from each of the first sub-filter element, the second sub-filter element, the third sub-filter element, and the fourth sub-filter element, the second single reflector being a continuous reflector-in-common for each of the first sub-filter element, the second sub-filter element, the third sub-filter element, and the fourth sub-filter element.

5. The array of multi-spectral filter elements of claim 1, wherein X and Y are each between 1 and 1000 nanometers.

6. A multi-spectral filter system comprising:
an array of super-pixels, each super-pixel including a substrate and an optical cavity layer, the optical cavity layer being a solid dielectric layer;
a corresponding array of multi-spectral filter elements, each of the multi-spectral filter elements being coupled to respective ones of the array of super-pixels, being adapted to respond to electromagnetic radiation within a plurality of spectral bands, and comprising:
   a first sub-filter element adapted to respond to electromagnetic radiation within a first one of the plurality of spectral bands, the first sub-filter element comprising a first optical cavity having an average thickness of approximately X;
   a second sub-filter element adapted to respond to electromagnetic radiation within a second one of the plurality of spectral bands, the second sub-filter element comprising a second optical cavity having an average thickness of approximately X−Y;
   a third sub-filter element adapted to respond to electromagnetic radiation within a third one of the plurality of spectral bands, the third sub-filter element comprising a third optical cavity having an average thickness of approximately X−Z; and
   a fourth sub-filter element adapted to respond to electromagnetic radiation within a fourth one of the plurality of spectral bands, the fourth sub-filter element comprising a fourth optical cavity having an average thickness of approximately X−(Y+Z);
   wherein each of the first optical cavity, second optical cavity, third optical cavity, and fourth optical cavity comprise respective portions of the optical cavity layer of the respective ones of the array of super-pixels, and wherein the optical cavity layer provides one continuously joined base layer for all of the first sub-filter element, the second sub-filter element, the third sub-filter element, and the fourth sub-filter element; and
wherein Y and Z are non-zero values of linear dimension, both being less than X, and wherein Y+Z is less than X.

7. The multi-spectral filter system of claim 6, wherein X is between 5 and 5000 nanometers.

8. The multi-spectral filter system of claim 6, wherein each super-pixel further comprises at least one reflective layer disposed outwardly from each of the first sub-filter element, the second sub-filter element, the third sub-filter element, and the fourth sub-filter element, the at least one reflective layer being a continuous reflector-in-common for each of the first sub-filter element, the second sub-filter element, the third sub-filter element, and the fourth sub-filter element.

9. The multi-spectral filter system of claim 8, wherein the at least one reflective layer includes at least one layer of germanium (Ge) and at least one layer of zinc sulfide (ZnS).

10. The multi-spectral filter system of claim 6, wherein each super-pixel further comprises at least one reflective layer disposed between the substrate and each of the first sub-filter element, the second sub-filter element, the third sub-filter element, and the fourth sub-filter element, the at least one reflective layer being a continuous reflector-in-common for each of the first sub-filter element, the second sub-filter element, the third sub-filter element, and the fourth sub-filter element.

11. The multi-spectral filter system of claim 10, wherein the at least one reflective layer includes at least one layer of germanium (Ge) and at least one layer of zinc sulfide (ZnS).

12. The multi-spectral filter system of claim 6, wherein the optical cavity layer comprises zinc sulfide (ZnS).

13. The multi-spectral filter system of claim 6, wherein the respective ones of the plurality of spectral bands each comprise respective spectral wavelength ranges between 1 and 30 micrometers.

14. The multi-spectral filter system of claim 6, wherein the respective ones of the array of super-pixels are adjacently positioned and the substrates of adjacent super-pixels are co-joined such that the substrates provide a common base for the array of super-pixels.

15. The multi-spectral filter system of claim 6, further comprising:
a first reflective layer disposed outwardly from each of the first sub-filter element, the second sub-filter element, the third sub-filter element, and the fourth sub-filter element, the first reflective layer being a continuous reflector-in-common for each of the first sub-filter element, the second sub-filter element, the third sub-filter element, and the fourth sub-filter element; and
a second reflective layer disposed between the substrate and each of the first sub-filter element, the second sub-filter element, the third sub-filter element, and the fourth sub-filter element, the second reflective layer being a continuous reflector-in-common for each of the first sub-filter element, the second sub-filter element, the third sub-filter element, and the fourth sub-filter element.

* * * * *